2 Sheets—Sheet 1.

H. A. HANNUM.

COMMINUTING MACHINE.

No. 11,298. Reissued Jan. 3, 1893.

WITNESSES:

C. L. Bendixon

Mark V. Dewey

INVENTOR:

Henry A. Hannum

By Hull, Lacey & Hull his ATTORNEYS.

THE NORRIS PETERS CO., PHOTO-LITHO., WASHINGTON, D. C.

H. A. HANNUM.

COMMINUTING MACHINE.

No. 11,298. Reissued Jan. 3, 1893.

WITNESSES:

E. L. Bendixon

Mark W. Dewey

INVENTOR:

Henry A. Hannum

By Dull, Laass & Dull his ATTORNEYS.

THE NORRIS PETERS CO., PHOTO-LITHO., WASHINGTON, D. C.

UNITED STATES PATENT OFFICE.

HENRY A. HANNUM, OF CAZENOVIA, NEW YORK, ASSIGNOR OF ONE-HALF TO PILLSBURY A. WEBSTER, OF SAME PLACE.

COMMINUTING-MACHINE.

SPECIFICATION forming part of Reissued Letters Patent No. 11,298, dated January 3, 1893.

Original No. 470,395, dated March 8, 1892. Application for reissue filed June 2, 1892. Serial No. 435,437.

*To all whom it may concern:*

Be it known that I, HENRY A. HANNUM, a citizen of the United States, and a resident of Cazenovia, in the county of Madison, in the State of New York, have invented new and useful Improvements in Comminuting-Machines, of which the following, taken in connection with the accompanying drawings, is a full, clear, and exact description.

This invention relates to a comminuting machine designed chiefly for cutting up green bones for chicken-feed, but also adapted for cracking corn, slicing vegetables and reducing other substances to fine particles. And the invention consists in a novel construction and combination of its component parts constituting a comminuting machine of great efficiency and convenience in its operation, as hereinafter fully described and specifically set forth in the claims.

Figure 1:
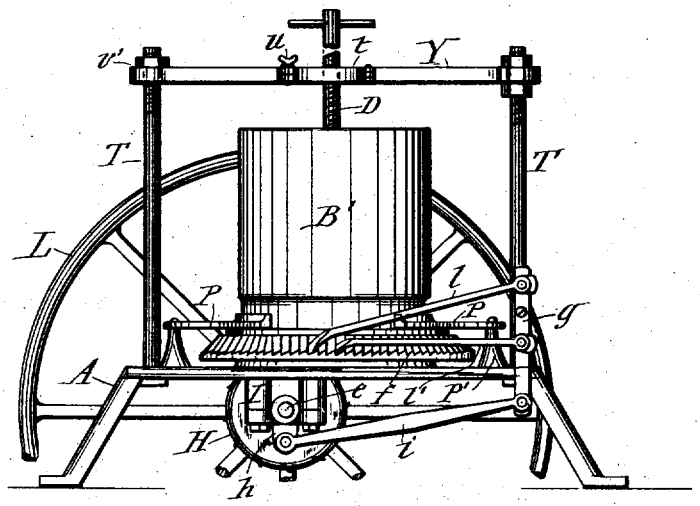
Figure 2:
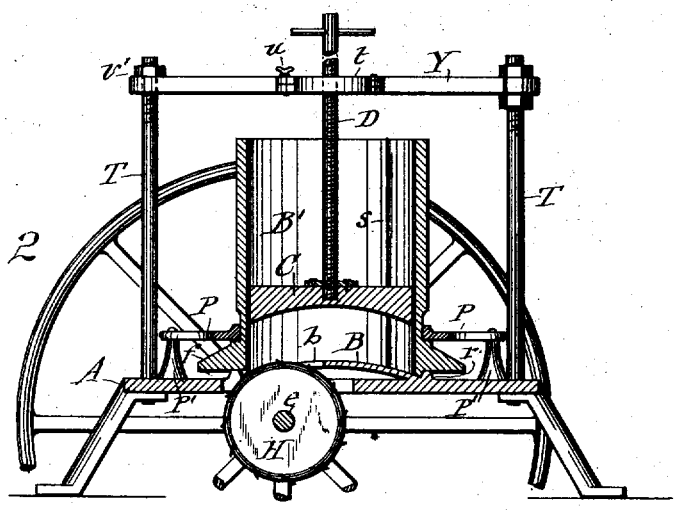
Figure 3:
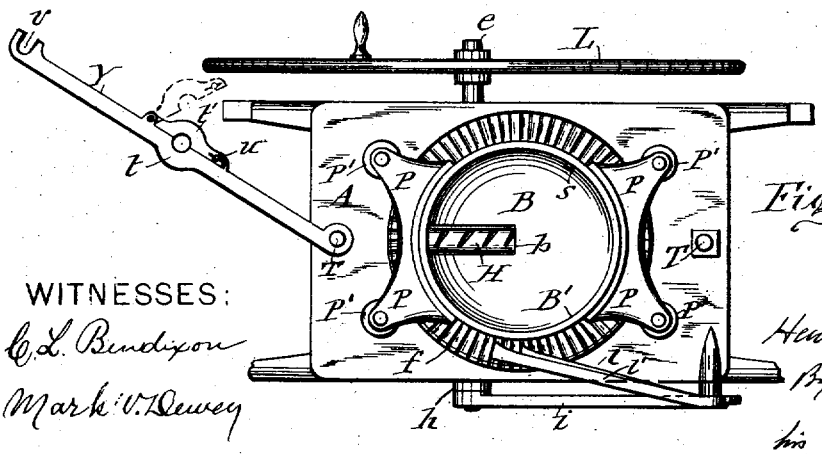
Figure 4:
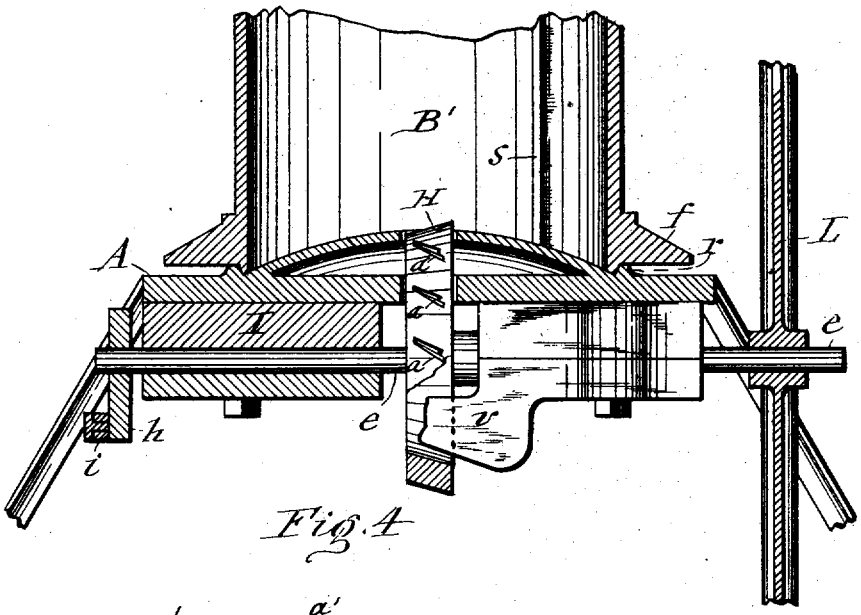
Figure 5:
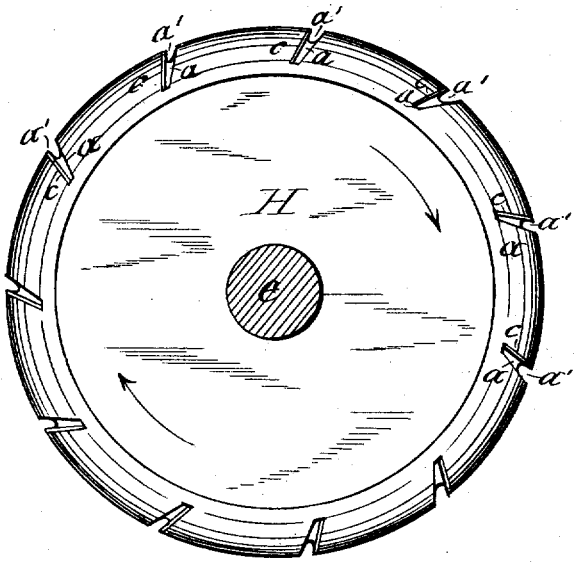
Figure 6:
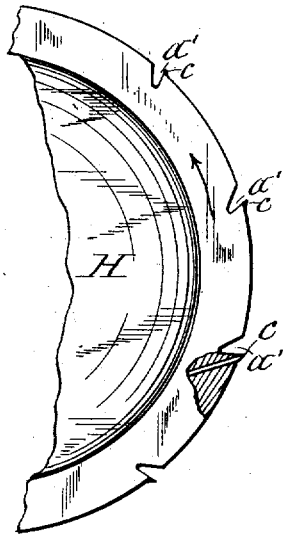

In the annexed drawings Figure 1 is a side elevation of a machine embodying my invention, Fig. 2 is a vertical transverse section, Fig. 3 is a top plan view with the yoke and follower removed, Fig. 4 is an enlarged vertical transverse section of the base of the hopper and adjacent parts, Fig. 5 is an enlarged detached side view of the cutter-head viewed from the smaller side thereof, and Fig. 6 is a view of a section of the larger side of the cutter-head, a portion thereof being broken away to show the attachment of the cutter.

Similar letters of reference indicate corresponding parts.

A—represents the supporting frame of the machine, which frame may be of any suitable shape formed of metal. It has rigidly attached to it or integral with it an annular raised portion—B—which constitutes the bottom of the hopper—B′. Said bottom being thus convex on its top. Through this bottom is a slot—*b*—extending radially from one side partway across the same as clearly seen in Figs. 2 and 3 of the drawings. Beneath the bottom—B—is a horizontal shaft—*e*—disposed at one side of the axis of the hopper and crosswise of the slot—*b*—and journaled in suitable bearings—I—I—on the frame—A. To this shaft is firmly secured the annular cutter-head—H—, the periphery of which protrudes through the slot—*b*. The peripheral face of this cutter-head is beveled to one side so that the lower side faces in opposite direction from the rotation of the hopper and is flush with the surface of the bottom—B—of the hopper to allow the bones or other substance to be easily carried onto the cutter-head by the rotation of the hopper and its follower. The periphery of the cutter-head is provided with transverse slots—*a*—*a*—preferably diagonally across the face and inclined rearward from the low to the high side of the cutter-head as clearly shown in Fig. 5 of the drawings.

*c*—*c*—represent the cutters which are set along one side of the respective slots and secured in grooves in the cutter-head at the ends of the slots as shown in Figs. 5 and 6 of the drawings.

In order to obtain ample clearance for the fragments of bones not sufficiently reduced to pass through the slots—*b*—, I widen the slots—*a*—*a*—toward the high side of the cutter-head and provide said side of the cutter-head with clearing notches—*a*′—*a*′—so that such coarse fragments of bone cannot clog in front of the cutter, but slide along the edge of the slots and through the clearing notches—*a*′—and into the hopper and are again brought around to be acted on by the cutters. The cutter-head may be rotated either by a hand wheel—L—or a pulley, or gear attached to one end of the shaft—*e*. Upon the hopper-bottom is mounted revolubly the hopper—B′—preferably by providing the former with an annular rib—*r*—inside of which the outer bottom edge of the hopper is fitted so as to allow the hopper to turn as best seen in Fig. 4 of the drawings. The hopper is retained in its seat on the bottom—B—by means of plates—P—P—secured to posts—P′—P′—on the frame—A—and bearing on shoulders on the exterior of the hopper above the rack—*f*—which is attached to the base of the hopper—B′.

To the frame—A—is pivoted a lever—*g*—and to the lever at opposite sides of the fulcrum thereof are connected two pawls—*l*—*l*′—which engage the rack—*f*. A pitman—*i*—connects the said lever to a crank—*h*—secured to the shaft —*e*— and thus the lever —*g*— receives an oscillatory motion, which, by means of the pawls —*l*—*l'*—, imparts an intermittent rotary motion to the hopper —B'. By throwing one of said pawls off from the rack —*f*— so as to retain it out of engagement therewith, the speed of the revolution of the hopper —B'— can be reduced half when desired, which may be required in comminuting very hard substances.

At opposite sides of the hopper —B'— are two standards —T—T— rigidly secured to the frame —A— and extending above the top of the hopper. A yoke or cross-bar —Y— is pivoted at one end to one of the standards and removably connected at the opposite end to the other standard, preferably by a notch —*v*— in the side of the yoke, which notch allows the yoke to be slipped sidewise onto the standard, and a nut —*v'*— on the standard over the yoke prevents the latter from being forced upward and off from the standard. Central over the hopper —B'— the yoke —Y— is formed with a half-nut —*t*—, and to the side of the yoke is hinged a strap —*t'*— formed with a similar half-nut so that by laying said strap closely against the side of the yoke a complete nut is formed. The strap is retained in said position by a pin —*u*— passing through perforated ears on the strap and yoke. The object of dividing the nut as aforesaid is to facilitate the attachment and detachment of the feed-screw to and from the yoke when required. In the hopper —B'— is a vertically movable follower —C— to the center of the top of which is firmly attached an upright feed-screw —D— which works in the aforesaid nut on the yoke —Y. To compel the follower and feed-screw to turn with the hopper I connect said hopper with the follower by a vertical tongue —*s*— on one entering a groove in the other.

In operating the described machine the strap —*t'*— is to be swung aside to separate the nut on the yoke as indicated by dotted lines in Fig. 3 of the drawings. Then the yoke is to be swung on its pivot to carry it to one side and away from over the top of the hopper, then the follower —C— is to be withdrawn from the hopper. The bones or other substance to be cut up or comminuted are then introduced into the hopper, the follower replaced over said substance, the yoke —Y— swung back over the hopper and secured to the standard, and the strap —*t'*— placed across the screw —D— and fastened to the yoke. Then by turning the shaft —*e*—, the cutter-head —H— is rotated and at the same time the hopper —B'— with the follower —C— and feed-screw —D— receive intermittent rotary motion, and by the turning of said screw the follower is caused to press the bones against the cutters —*c*—*c*— as rapidly as they are reduced. In this comminuting operation my machine is rendered very effective by the arrangement of the cutter-head at one side of the center of the convex hopper-bottom, and the protrusion of the beveled cutter-head to a point above the apex of the said bottom.

In the operation of the machine the bones are carried successively across the cutter-head from the lower to the higher side thereof, and by the projection of said higher side above the surface of the stationary hopper-bottom —B— a space is produced directly over the rear portion of the said bottom, and thus the bones are allowed to be carried freely to the cutter-head from the lower side thereof, and the pressure of the follower is directly over the cutter-head.

To clear the cutter-head of the cut substances passing through the slots of the cutter-head I attach to the underside of the frame —A— a scraper —V— which stands closely to the inner side of the cutter-head as shown in Fig. 4 of the drawings.

Having described my invention, what I claim as new and desire to secure by Letters Patent, is:—

1. A comminuting machine comprising a revoluble hopper having a stationary bottom, a revoluble annular cutter-head disposed with its axis at right angles to that of the hopper and with the top of its periphery protruding through the bottom of the hopper, and cutters standing transversely in the periphery of the cutter-head as set forth.

2. A comminuting machine consisting of a revoluble hopper, having a stationary bottom, a revoluble annular cutter-head disposed with its axis at right angles to that of the hopper and with the top of its periphery protruding through the bottom of the hopper, cutters standing transversely in the periphery of the cutter-head, and a follower in the hopper arranged to press upon the top of the substance to be comminuted as set forth.

3. In a comminuting machine, the combination, with the stationary frame, of a convex hopper bottom fixed to said frame and provided with a radial slot extending from one side part way across said bottom, a revoluble shaft beneath said bottom at right angles thereto and at one side of the axis of the hopper, an annular cutter-head fixed to said shaft and protruding through the aforesaid slot, cutters standing transversely in the periphery of the cutter-head, and a hopper rising from said convex bottom as set forth.

4. In combination with the hopper and its bottom, the revoluble annular cutter-head disposed with its axis horizontally and protruding with its periphery through said bottom, and cutters standing diagonally across the periphery of the cutter-head as set forth.

5. In combination with the hopper and its bottom, the revoluble annular cutter-head disposed with its axis horizontally and having its peripheral face beveled to one side and protruding through the aforesaid bottom, and cutters standing diagonally across said peripheral face of the cutter-head, substantially as described and shown.

6. The combination of a stationary hopper-bottom formed convex on top and provided with a slot extending from one side part way across, the hopper mounted revolubly on said bottom, an annular revoluble cutter-head disposed with its axis horizontally and at one side of the axis of the hopper and having its peripheral face beveled to one side and protruding through the slot of the hopper-bottom, and cutters standing diagonally across the said face of the cutter-head, substantially as described and shown.

7. The annular cutter-head —H— having its peripheral face beveled to one side and provided with the slots —*a*—*a*— widened toward the high side of the face, and the cutters —*c*—*c*— standing along one side of the slots, substantially as described and shown.

8. The annular cutter-head —H— having its peripheral face beveled to one side and provided with slots —*a*—*a*— diagonally across said face and widened toward the high side thereof, clearing notches —*a'*—*a'*— in said side of the face, and cutters —*c*—*c*— standing along one side of the slots, substantially as described and shown.

9. The annular cutter-head — H — having its peripheral face beveled to one side and provided with slots—*a*—*a*—diagonally across said face and widened toward the high side thereof, clearing notches —*a'*—*a'*— in said side of the face, and cutters —*c*—*c*— standing along one side of the slots, in combination with the stationary hopper - bottom —B— formed convex on top and provided with the slot —*b*— extending from one side partway across the said bottom, and the hopper —B'— mounted revolubly on the bottom —B—, substantially as described and shown.

10. A bone-cutting machine comprising a cylindrical hopper, rotary cutters protruding through the base of the hopper from the underside thereof, a follower in said hopper for pressing the bones against the cutters, a yoke over the follower, a feed-screw for applying pressure to the follower, and a diametrically divided nut sustained on the said yoke and having one section hinged to swing to and from the other section and thereby grasp and release the feed-screw, as set forth.

11. In combination with the supporting frame and hopper-bottom —B— fixed thereto, the cutter-head—H—protruding through said bottom, the hopper —B'— mounted revolubly on said bottom, the follower —C— connected to the hopper by vertical tongue and groove, standards —T—T—, the yoke —Y— provided with the nut —*t*, *t'*—, and the feed-screw —D— working in said nut and rigidly secured to the follower, substantially as described and shown.

12. In combination with the supporting frame, hopper and follower, the standards —T—T—, the yoke —Y— pivotally connected at one end to one of the standards and having its opposite end formed with a notch adapted to receive the upper end of the other standard, nuts on the standard over the yoke, a fixed half nut in the center of the yoke, a half nut hinged to said portion of the yoke and detachably locked thereon, and the feed-screw —D— fixed to the follower and working in the said nut, substantially as described and shown.

13. The combination of the supporting frame —A— having affixed to it the convex hopper-bottom —B—, the shaft —*e*— extending across the underside of the said bottom, the cutter-head —H— fixed to said shaft and protruding through the bottom, the hopper —B'— mounted revolubly on the bottom —B—, the annular rack —*f*— fixed to the exterior of the hopper, the lever —*g*— pivoted to the frame, the crank —*h*— secured to the shaft —*e*—, the pitman —*i*— connecting said crank to the lower end of the lever —*g*—, and the pawls —*l*— and —*l'*— connected to the said lever at opposite sides of the fulcrum and engaging the aforesaid rack, all combined to operate substantially as set forth.

HENRY A. HANNUM.

Witnesses:
E. LAASS,
MARK W. DEWEY.